Aug. 15, 1944.   L. E. MOBERLY   2,356,076
POROUS BRUSH AND METHOD OF MANUFACTURE
Filed Nov. 23, 1940
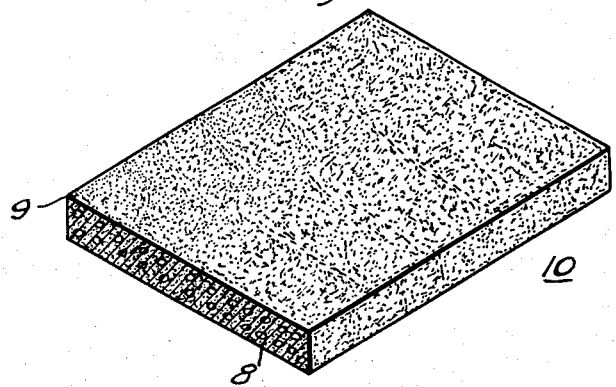
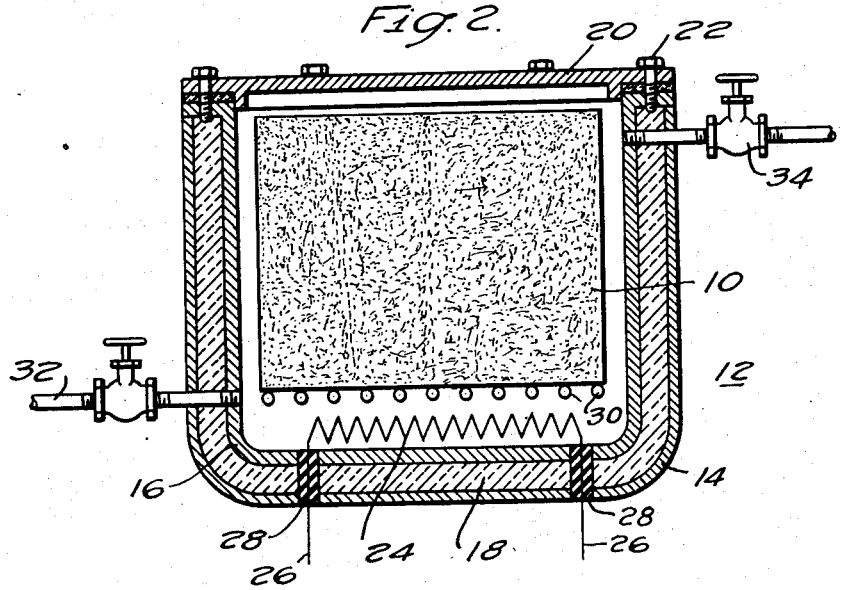
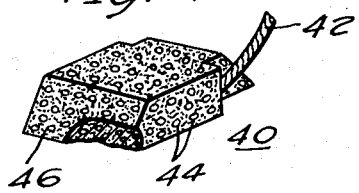
WITNESSES:
INVENTOR
Lawrence E. Moberly.
BY
ATTORNEY Patented Aug. 15, 1944

2,356,076

UNITED STATES PATENT OFFICE 2,356,076

POROUS BRUSH AND METHOD OF MANUFACTURE

Lawrence E. Moberly, Wilkinsburg, Pa., assignor to Westinghouse Electric & Manufacturing Company, East Pittsburgh, Pa., a corporation of Pennsylvania Application November 23, 1940, Serial No. 366,925

4 Claims. (Cl. 18—54.7)

This invention relates to molded carbon bodies, and more particularly carbon brushes and other members suitable for electrical purposes.

In preparing molded carbon bodies, such as brushes, by prior art processes, it has been found that the hardness, density and wear of the brushes could not be varied to any great extent for a process which would produce a brush having desirable electrical and physical properties. Electrographitic brushes in particular, since they are subjected to a graphitization treatment at temperatures of up to 5500° F., at which most impurities will volatilize and escape as gases, have fairly uniform hardness and other characteristics regardless of what previous operations they were subjected to. For some purposes, it is desirable to provide carbon bodies such as electrographitic brushes having densities and wear resistance not now obtainable.

The object of this invention is to provide a porous carbon brush.

A further object of this invention is to provide a process for producing a predetermined porosity in carbon bodies.

Other objects of this invention will be apparent from the following description and drawing when taken in conjunction with the appended claims.

Reference should be had to the accompanying drawing, in which:

Figure 1 is a perspective view of a green carbon plate;

Fig. 2 is a cross-sectional view of a heat treating apparatus; and

Fig. 3 is a perspective view partly in section of a completed porous carbon brush.

In making carbon bodies, such, for example, as carbon brushes, the raw materials, lampblack, coke, charcoal, graphite, and similar carbonaceous substances, are mixed in selected combinations and proportions. The mixture is combined with a binder, such as coal tar, pitches or resins. Slugs formed from the mixture are carbonized or coked by a suitable heat treatment, and the carbonized slugs are pulverized to a finely divided state. The material from the pulverized slugs is mixed with a binder and repulverized to insure good mechanical mixture and the product of this mixing operation is known as green carbon flour. Green carbon flour of a predetermined fineness is formed into a plate under pressures varying from 1000 to 20,000 pounds per square inch. These plates are carbonized by heat treatment following a carefully controlled temperature cycle to temperatures of about 2200° F. If properly heat treated, these plates are suitable for certain applications such as brushes and resistance plates in the electrical art by cutting to shape.

For some purposes, it is desirable to convert the carbon in the heat treated plates into the graphitic form. Graphitization of the plates is secured by heating the plates to extremely high temperatures of 3000° F. up to 5500° F. This high temperature treatment will convert as much as 80% of the carbon into the graphitic modification. The particular electrical and physical properties, such as the porosity, hardness and resistance of the brushes, is determined by the heat treatment and the method of forming the plates.

Since any particular cycle of operation produces a quantity of material which does not vary to any great extent in physical and electrical properties, it is frequently necessary to employ a carbon brush which meets most of the electrical and mechanical requirements and to put up with a few undesirable characteristics present therein. In some cases, it would be desirable to produce a brush having a given hardness and electrical conductivity, and in addition it would be desirable to have a greater porosity and wear resistance under given operating conditions than is customarily obtained for carbon plates having the former characteristics.

It has been found that any given carbon plate may be produced with a distribution of cavities or porosities of any desired amount and size. This will result in the production of a plate having the properties of the carbon material present therein modified by the physical presence of such cavities or porosities.

It has been found that, during the preparation of a carbon plate from green carbon flour, it is possible to distribute throughout the mass of green carbon flour a quantity of particles of predetermined size of a solid substance selected for its property of changing into a gas at predetermined temperatures. By applying temperatures above the predetermined temperature, the particles of the substance change to a gas and escape, leaving cavities conforming to the original particles.

Various solids may be used for incorporation into green carbon flour for this purpose. It has been found that certain chemical compounds when subjected to temperatures will break down into two gaseous components; examples of such compounds are urea, oxalic acid and ammonium carbonate. Upon heating to some elevated temperature, urea will decompose into ammonia and carbon dioxide; oxalic acid will break down into carbon monoxide, carbon dioxide and water; while particles of ammonium carbonate will result in the production of ammonia, water and carbon dioxide gases. Other solids exhibiting the property of transformation to a gas by application of heat are the depolymerizable resins, such as polystyrene, cumarone-indene and the like. When subjected to temperatures of the order of 300° C., polystyrene, for example, will depolymerize into the monomer which evaporates at this temperature and escapes as a gas. Also useable for this purpose are easily volatilized or evaporated solids; for example, ferric chloride ($FeCl_3$) will evaporate at temperatures above 235° C.

The green carbon flour is preferably admixed in the dry state with the predetermined amount of the sized particles of the selected solid. In some instances, it may be desirable to employ particles of the solid of several different sizes; in other cases, it may be more useful to produce a porous block having cavities of only one size present therein. After a thorough mixing of the solids and the green carbon flour in order to secure a good distribution of the solids, a binder is added to the mixture in order that the plate may be molded therefrom. The mixture is then placed in molds and subjected to pressures of the order of 1000 to 20,000 pounds per square inch.

Referring to Fig. 1 of the drawing, there is shown a plate 10 produced by the molding operation. This plate 10 consists of a compacted mass of fine green carbon flour 9 and a distribution of the particles 8 of the solid which is characterized by its transformation to a gas at predetermined temperatures.

An apparatus suitable for heat treatment of the green plate 10 is shown in Fig. 2. The heat treating apparatus 12 consists of an outer shell 14 and an inner shell 16 made of material capable of withstanding the required temperatures. Heat insulation 18 is placed between the shells 14 and 16. A closure 20 attached to the shell 16 by means of bolts 22 provides for the placing and removal of plates 10. An electrical heating element 24 is employed for producing the required temperatures. The conductor leads 26 to the resistance element 24 pass through electrically insulating bushings 28 capable of functioning at the temperatures secured in the apparatus 12. The plates 10 are preferably supported on bars 30 of some material which will function at the temperatures present within the container. An inlet 32 and an outlet 34 are provided for the introduction or withdrawal of predetermined gaseous constituents in order to secure a plate of desired properties.

Inasmuch as there are numerous materials suitable for the solid particles 8 which will volatilize at temperatures of under 500° C., the construction of the heat treating apparatus of Fig. 2 is not critical, but any apparatus heated by other means, such as gas, which will give the required temperatures, may be used for this purpose. The function of the apparatus is to provide for maintaining the plates at a temperature at which the particles 8 will be transformed into a gas which will filter through the molded carbon mass 9. In some cases the binder in plate 10 will also carbonize. After a sufficient heat treatment time to insure that all of the gaseous particles 8 have escaped as a gas, the plate 10 may be subjected to further heat treatment in the same apparatus as shown in Fig. 2, or in other apparatus, to cause the complete carbonization of the binder in the plate, to produce a plate suitable for use as a carbon brush. In some cases, after this treatment, the porous plate may be subjected to an additional graphitization treatment. In order to cause the carbon in the plate to change to the graphitic modification, the plate may be subjected to temperatures of 3000° to 5500° F.

Regardless of the subsequent heat treatments, the cavities produced by the escape of the volatilized solids 8 persist in the mass of carbon. It is here pointed out that all carbonized brushes consist of a ground mass of fine carbon or graphitic particles bonded together by a carbonized binder, and that the material has fine interstices or pores between the carbon particles as a normal occurrence therein due to carbonization of the green carbon at temperatures of up to 2200° F. By means of this invention, cavities or pores of a larger size than the fine porosities normally existing are introduced into the brush structure. In this way, the physical make-up of the brush is altered to include a much greater proportion of cavities than was heretofore possible in the material.

Referring to Fig. 3 of the drawing, there is shown a completed brush 40 produced by the above process. The brush 40 is produced from plates 10 by suitable cutting operations by means of carborundum saws and the like. The conductor 42 is attached to the prepared brush 40 in the customary manner. The structure of the carbon brush 40 now exhibits the normal ground mass 46 consisting mainly of the fine carbon particles spaced from one another in a manner to have fine interstices or pores. In addition, the brush exhibits larger cavities 44 distributed throughout the mass of the brush. The brush 40 will wear much faster than a similar brush consisting entirely of the ground mass structure 46. The density of the brush is less due to the fact that the pores 44 are present. For some brushes, the alteration in the physical properties of the brush 40 presents considerable advantages.

This process of producing a predetermined proportion and size of cavities throughout a given ground mass of carbon may be applied to other articles and materials than the brush such as shown in Fig. 3. In some cases, filtering elements and resistance elements and the like may be given desirable changes in properties in this manner.

Furthermore, it is to be understood that the particular form of product shown and described and the particular procedure set forth are presented for the purposes of explanation and illustration, and that various modifications of said product and procedure can be made without departing from the scope of the appended claims.

I claim as my invention:

1. An electrical contact member comprising a porous block consisting substantially entirely of nongraphitized carbonaceous particles, the porous block consisting of a ground bonded mass of fine particles and fine pores such as are normally produced by compacting the fine carbon particles mixed with a binder under a pressure of from 1000 pounds per square inch and upward and heat treated, and a distribution of voids of a predetermined size larger than the fine pores resulting from an incorporation of solids of predetermined size within the compacted body, said solids being characterized by practically complete volatilization and escape during the heat treatment leaving voids corresponding substantially to the shape of the incorporated solids.

2. An electrographitic brush comprising a porous block composed of a major proportion of finely divided graphitic particles, held together by a carbonized binder, the finely divided graphitic particles being distributed to form fine pores resulting from the heat treatment at about 2200° F. of a compacted mass of carbon and the binder, and a distribution of pores of a predetermined size larger than the finest pores throughout the block, the larger pores produced by an incorporation of solids of predetermined size throughout the compacted mass, the incorporated solids being characterized by evaporation during the heat treatment thereby creating the larger pores corresponding substantially to the shape of the incorporated solids.

3. The process of producing electrographitic brushes which comprises, in combination, distributing particles of predetermined size of a solid characterized by a transformation into a gas above a predetermined temperature in green carbon flour, the solid being substantially neutral to the green carbon flour, compacting the mixture under pressure into a plate, heat treating the plate at a temperature above said predetermined temperature to carbonize the binder and to cause the transformation of the particles of the solid into gases, the gases escaping from the plate and producing cavities conforming substantially to the shapes of the particles in the plate and subjecting the porous plate to graphitizing heat treatment.

4. The process of producing electrographitic brushes which comprises, in combination, distributing particles of predetermined size of a solid characterized by a transformation into a gas above a predetermined temperature in green carbon flour, compacting the mixture under pressure into a plate, heat treating the plate at a temperature above said predetermined temperature to carbonize the binder and to cause the transformation of the particles of the solid into gases, the gases escaping from the plate and producing cavities conforming substantially to the shapes of the particles, subjecting the porous plate to graphitizing heat treatment, and severing the plate into predetermined shape.

LAWRENCE E. MOBERLY.